No. 862,465. PATENTED AUG. 6, 1907.
J. A. FRÉUND.
REGULATING DEVICE FOR BALANCE WHEELS.
APPLICATION FILED NOV. 14, 1905.
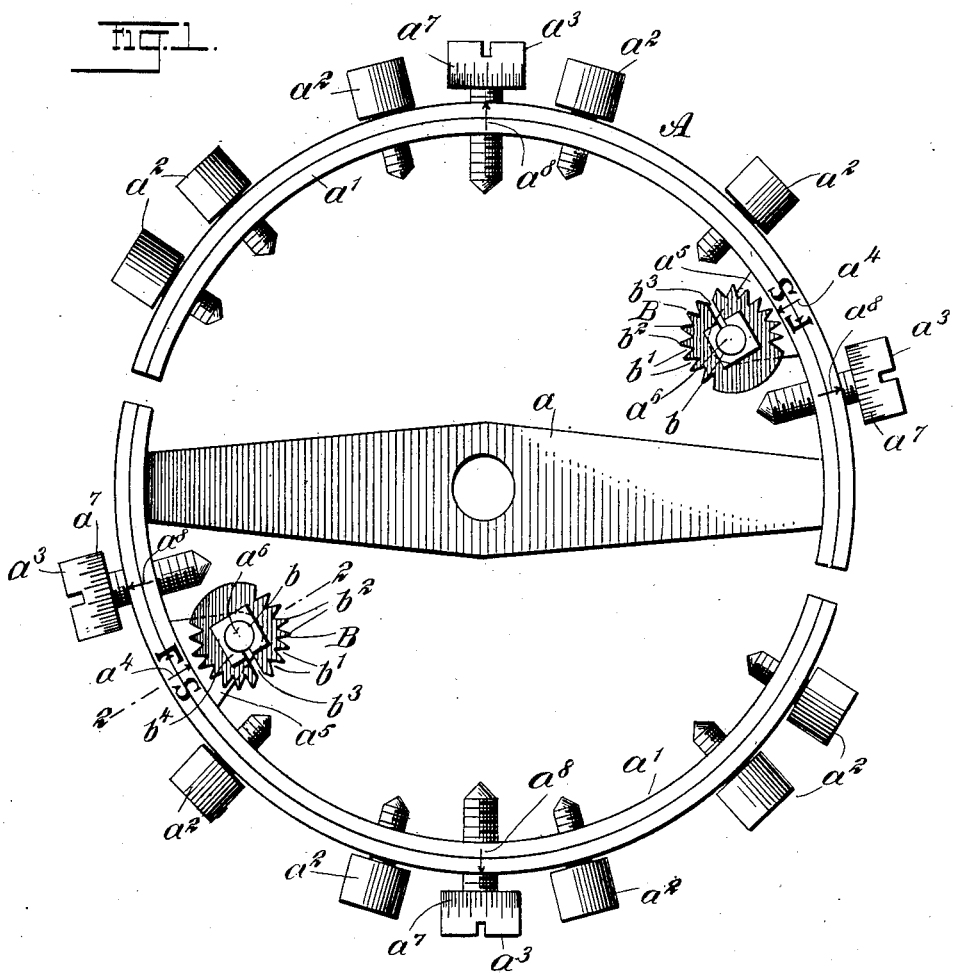
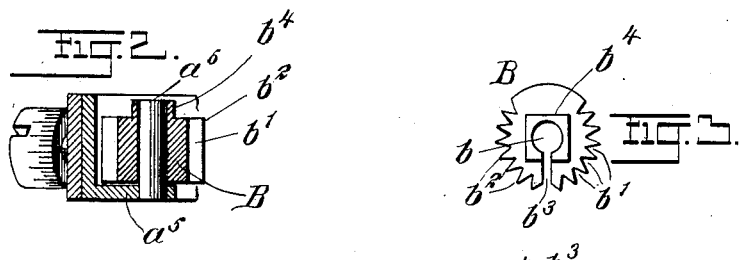
INVENTOR
Joseph Alexandre Freund
BY
his ATTORNEY.

UNITED STATES PATENT OFFICE.

JOSEPH ALEXANDRE FRÉUND, OF NEW YORK, N. Y.

REGULATING DEVICE FOR BALANCE-WHEELS.

No. 862,465.  Specification of Letters Patent.  Patented Aug. 6, 1907.

Application filed November 14, 1905. Serial No. 287,243.

*To all whom it may concern:*

Be it known that I, JOSEPH ALEXANDRE FRÉUND, a citizen of the United States, and a resident of the borough of Manhattan, in the city, county, and State of New York, have invented a certain new and useful Improvement in Regulating Devices for Balance-Wheels, of which the following is a specification.

My invention, while applicable to balance wheels of the oscillating class generally, is here shown applied in connection with the balance wheel of a watch or clock; its object being to provide a balance wheel which shall be equipped with means whereby its speed of oscillation may be regulated and controlled, without the use of the ordinary regulating devices usually employed for that purpose.

To this end, the invention consists in certain peculiarities of construction and combination of parts, all as will be hereinafter more specifically described and the features of novelty pointed out in the subjoined claim.

Referring to the accompanying drawings, which form a part of this specification, Figure 1, is an enlarged plan view of a balance wheel constructed in accordance with my invention. Fig. 2, a vertical section thereof, taken radially of the same in the plane 2—2 of Fig. 1. Fig. 3, a plan view of one of the regulating weights detached, and Fig. 4, an edge view thereof.

In all figures like letters of reference are employed to designate corresponding parts.

A indicates a balance wheel, which is or may be of any ordinary or preferred construction, and B indicates the weights by means of which the regulation of the speed of oscillation of the wheel is effected.

In the form of the invention which I have selected for the purpose of illustration, I have shown the balance wheel as of the compensating class, in which $a$ indicates the arm of the wheel; $a^1$ the segments comprising the rim thereof and made up from strips of dissimilar material; $a^2$ the balance-screws, and $a^3$ the mean-time screws, all of which are or may be constructed and combined as is customary with balance wheels of this class as heretofore employed.

The weights B, like the balance wheel proper, may be constructed in any approved form, it only being essential that, whatever their construction, they be mounted upon seats carried by the rim of the balance wheel and be capable of movement thereon to effect the required regulation. In the drawings however I have shown these weights as constructed in the form of disks, with a circular orifice $b$ formed axially through each, and with portions of their peripheries cut away whereby to carry their centers of mass to one side of the axes of their respective orifices $b$, but this form of construction is merely illustrative, and other forms of weight may be employed in lieu thereof if so desired. When however the form of construction shown in the drawing is employed, the removal of a portion of the periphery of each of the weights is effected by cutting a number of V shaped nicks $b^1$ therein, whereby to form corresponding shaped teeth $b^2$ between them, to serve, in connection with a stationarily arranged index-line or arrow $a^4$, as graduations. As thus constructed, the weights B are mounted upon their supporting seats, which may be arranged in various positions upon the rim $a^1$ of the balance wheel. In the drawings I have shown their seats formed upon the upper side of ears or brackets $a^5$, secured to or formed upon the interior of the rim $a^1$, and, projecting inwardly therefrom, are severally provided near their outer free ends with vertically arranged studs $a^6$, upon which the weights are fitted to rotate, as shown. With the weights thus arranged upon the studs $a^6$, they are held thereon in adjusted positions by friction, which may be increased or diminished by closing the material of the weights upon, or opening it outward from, their respective studs, to permit of which operation the weights are each provided with a suitable slot $b^3$, extending from its orifice $b$ to its periphery; and in order to facilitate the rotation of the weights upon their respective supporting studs, when desired, I preferably provide each with a rectangular portion $b^4$, extending upward from its upper surface, with which may be engaged a pair of tweezers or a suitable wrench, as may be found convenient. The weights B, being thus arranged, their adjustment to vary the speed of oscillation of the balance wheel will be effected by rotating them upon their respective pivots in one or the other directions, when the centers of their respective masses will be carried outward from the axis of the wheel in the one case, and, inward toward the same in the other, the amount of rotation imparted to the weights being indicated by the number of the teeth $b^2$ that are carried past their respective coöperating index-lines or arrows $a^4$, which, in the form of the invention shown in the drawings, are located on the rim $a^1$ of the wheel in appropriate relationship to them.

With the weights mounted and adjusted as above explained, I, in practice, preferably employ a plurality of them in connection with each balance wheel, and insure of the complete poise and balance of the wheel by locating them on opposite sides of its axis in diametrical relationship thereto, when two weights are employed, or at equal distances apart around its rim when a greater number are made use of, and by so adjusting them in accomplishing any required regulation of the wheel that the center of the mass of each shall be at the same distance from the axis of the wheel as that of the other or others. As thus arranged and related, not only is the poise and balance of the wheel insured, but each of the weights serves as an indicator to indicate the position occupied by the other or others when in adjusted position, as well as the point from which the other or any one of the others, as the case may be, may have been moved in making an adjustment or otherwise when such point has been forgotten or was not noted. With the weights B thus employed the movement of the balance wheel may be regulated and its speed of oscillation controlled by these weights alone, without the assistance of other appliances. I prefer however to employ in connection with these weights the mean-time screws $a^3$, and to accomplish the "roughing out" or approximate regulation of the wheel by the screws, and to perfect and complete the regulations by the weights B, as this latter result can be effected by them without removing the balance wheel from the watch or clock, or other mechanism, as is necessary when the regulation is accomplished by the mean-time screws $a^3$ alone.

As is the case with the weights B, the complete poise and balance of the wheel can only be accomplished when the centers of mass of these mean-time screws are all at the same distance from the axis of the wheel, or, in other words, when they all project to the same distance therefrom; and, in order to insure of this being accomplished and the several screws $a^3$ rotated to the same distance in effecting their regulating action, I find it convenient to provide their heads with graduation-lines $a^7$, which coöperate with appropriate index-lines or arrows $a^8$, arranged radially on the rim $a^1$ of the wheel in proper relationship to them. By this provision, as will be seen, not only is the exact angular distance through which each screw is rotated clearly seen, but each screw serves as an indicator to indicate the point from which any one of the other screws may have been rotated in effecting any required adjustment thereof or otherwise.

With the parts constructed and arranged as above described, it will be seen that, by the employment of the weights B, I provide means through which the movement of the balance wheel of a watch or clock, or other mechanism, may be regulated and controlled, without removing the wheel from its coöperating parts, or otherwise disarranging the mechanism in connection with which it may be employed, and which, in addition, may be operated to effect the required regulation, without danger of springing or bending the staff or axle upon which the wheel is mounted. Moreover, by the employment of these weights the usual regulating devices heretofore employed may be dispensed with, and the accurate regulation of the wheel effected; while by the employment of these weights, with the mean-time screws a degree and limit of regulation may be attained that is not possible with the regulating devices at present in use.

Although in the foregoing I have described the best means contemplated by me for carrying my invention into practice, I wish it distinctly understood that I do not limit myself strictly thereto, as it is obvious that modifications may be made in various of the details without departing from the spirit of the invention.

Having now described my invention and specified certain of the ways in which it is or may be carried into effect, I claim and desire to secure by Letters Patent of the United States—

1. The combination, with a balance wheel provided on the interior of its rim with seats that are constructed in the form of ears or brackets $a^5$, and a vertically arranged stud $a^6$ arranged in the outer free end of each of these ears or brackets, of a weight B rotatively mounted upon each of these studs and provided with a radial slot $b^3$ and with V shaped nicks $b^2$, and an index-line or arrow $a^4$ formed upon the rim of the wheel in proper relationship to the teeth between such nicks, and a rectangular upwardly projecting portion $b^4$ formed on the upper side of the weight, substantially as described.

2. The combination, with a balance wheel provided on the interior of its rim with seats that are constructed in the form of ears or brackets $a^5$, and a vertically arranged stud $a^6$ arranged in the outer free end of each of these ears or brackets, of a weight B rotatively mounted upon each of these studs and provided with a radial slot $b^3$ and with V-shaped nicks $b^2$, and an index-line or arrow $a^4$ formed upon the rim of the wheel in proper relationship to the teeth between such nicks, a rectangular upwardly projecting portion $b^4$ formed on the upper side of the weight, a plurality of mean-time screws coöperating with said weights, said mean-time screws being provided with graduations and a coöperating index on the rim of the wheel, whereby the exact angular adjustment of said mean-time screws is determined.

In testimony whereof I have hereunto set my hand this 10th day of November, 1905.

JOSEPH ALEXANDRE FRÉUND.

Witnesses:
WM. H. APPLETON,
GRACE DIXON.